Patented Dec. 26, 1939

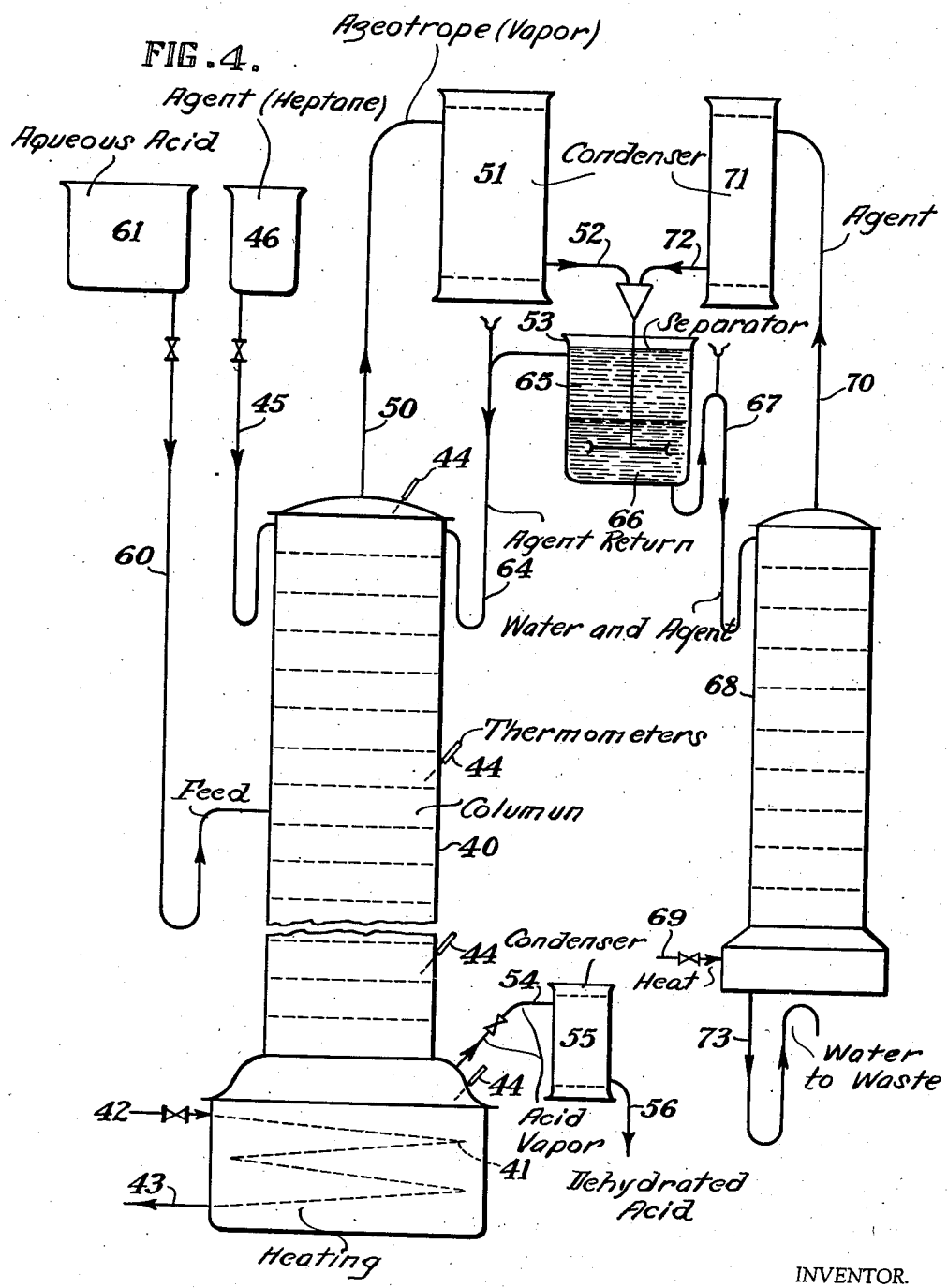

2,184,563

UNITED STATES PATENT OFFICE 2,184,563

PROCESS FOR CONCENTRATING ACETIC ACID

Donald F. Othmer, Brooklyn, N. Y., assignor, by mesne assignments, to Eastman Kodak Company, Jersey City, N. J., a corporation of New Jersey Original application February 6, 1931, Serial No. 513,989. Divided and this application April 12, 1935, Serial No. 16,052

8 Claims. (Cl. 202—42)

This invention relates to an improved process for the concentration of acetic acid from aqueous solutions thereof and more particularly to processes employing heptane and/or dioxan as withdrawing agents. It is applicable to solutions of practically any percentage or strength, as well as to those which may be contaminated by impurities in solution or suspension. The process of this invention is furthermore applicable to solutions of acid irrespective of how such solutions may have been formed or obtained, as for example, solutions involving pyroligneous acid, acetic acid obtained as a waste product in acetylation processes such as the acetylation of cellulose, fermentation acid, etc.

This application is a division of my application 513,989, filed Feb. 6, 1931, now U. S. Patent Number 2,028,800 of January 28, 1936.

Among the numerous methods known for the concentration of acetic acid solutions, two may be mentioned. One is the method of extracting the acid from its aqueous solution with some material which is a solvent for the acid and which is relatively insoluble in water. Another is the method of removing the water or dehydrating the acid by means of a distillation operation employing some added material which may be called a withdrawing agent, which forms with water on heating, a constant boiling or azeotropic mixture having a boiling point sufficiently lower than that of the acetic acid to permit the rectification of the mixture and the resulting removal of water from the acetic acid solution in the usual operations and equipment familiar in the art of distillation.

It is primarily with the second or distillation method that the present invention is concerned, although certain aspects of the invention also may make use of the features of the first or solvent method.

One object of the invention is to provide a generally improved, more efficient, and more satisfactory process for concentrating or dehydrating acetic acid.

Still another object is the provision of a process of a simple and effective nature capable of employing withdrawing agents from a class heretofore believed to be unsuitable.

Another and very important object is to provide an improved process which results in the complete rectification of acetic acid without leaving any residue of the withdrawing agent therein.

A further object is the provision of a process which will save a substantial amount of the heat which it has heretofore been necessary to use in prior processes of concentrating acetic acid.

A still further object is the provision of a process employing a withdrawing agent which may possess to some extent the property of a solubility for acetic acid from its solutions so that the withdrawing agent may also be used as an extracting agent for extracting acetic acid from the solution.

Another object is the provision of an improved, more effiecient, and more satisfactory continuous process for the concentration of acetic acid.

To these and other ends the invention resides in certain improvements and combinations of parts, all as will be hereinafter more fully described, the novel features being pointed out in the claims at the end of the specification.

In the drawings:

Fig. 4 is a diagrammatic view of a preferred form of apparatus for carrying out the process.

Similar reference numerals throughout the several views indicate the same parts.

Figure 1:
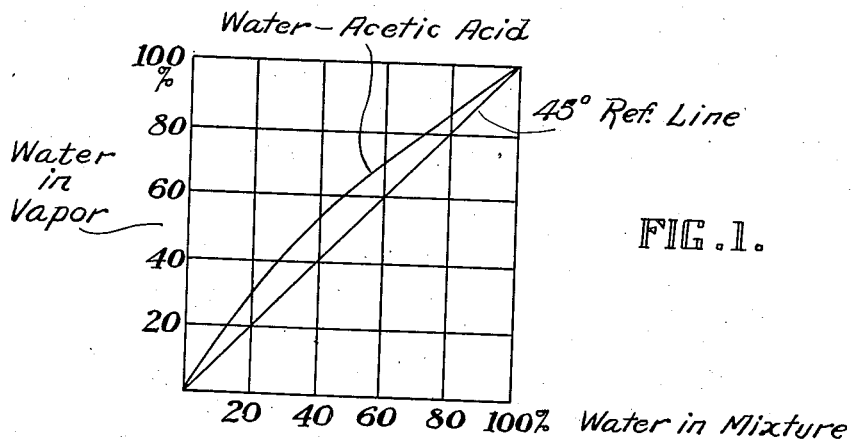
Fig. 1 is a vapor composition curve of a mixture of acetic acid and water.

The general use of a withdrawing agent in concentrating or dehydrating an aqueous solution of acetic acid is explained and set forth in British Patent No. 327,444, accepted April 3, 1930, which patent is the result of a prior invention made jointly by Hans T. Clarke and the present applicant, Donald F. Othmer. Reference is made to said British patent for a disclosure of the general principles underlying the use of a withdrawing agent (referred to as an "auxiliary liquid" in said patent), which need not be repeated here. The said patent sets forth eight chief requirements for an auxiliary liquid or withdrawing agent for use in distilling water from aqueous acetic acid, which eight requirements still hold in connection with the present invention, with the exception of requirement No. 3. This states that the withdrawing agent should boil at a lower temperature than acetic acid so that it would be readily and completely separable from the latter by distillation. It should be noted that the present invention contemplates the use of withdrawing agents which do not boil sufficiently lower than acetic acid to permit such complete separation readily by distillation. This fact is not found to be detrimental because, according to the present invention, when the process is properly and efficiently carried out according to the preferred embodiment of this invention the withdrawing agent does not become mixed with the concentrated acetic acid.

The withdrawing agents which have heretofore been considered suitable for use in concentrating acetic acid may be divided in general into two classes. The first comprise what might be termed the low boiling point class, such as ethylene dichloride disclosed in the aforesaid British Patent No. 327,444, benzol disclosed in United States Patent No. 1,722,532 to Maude and ethyl acetate disclosed in British Patent No. 284,588 to I. G. Farbenindustrie Aktiengesellschaft. The second group comprises what might be termed the high boiling point class such as butyl acetate, as disclosed in British Patent No. 298,137 to Dr. Alexander Wacker Gesellschaft.

Withdrawing agents of the low boiling point group have been considered suitable because any excess of withdrawing agents could be readily separated from the concentrated acetic acid by distillation. Withdrawing agents of the high boiling point group have been unsuitable from the standpoint of easy separation of excesses by distillation, but it has been possible to use them in some circumstances by following the method disclosed in said British Patent No. 298,137. Withdrawing agents boiling between the boiling points of the low boiling group and the high boiling group have heretofore been considered unsuitable and impracticable for use because of the difficulty of separating excesses of such withdrawing agents from the concentrated acetic acid.

I have now discovered, however, according to the present invention that not only are withdrawing agents, such as heptane and dioxan, boiling in an intermediate range between 88° C. 103° C. suitable for use instead of being unsatisfactory as heretofore believed, but I have further discovered that such withdrawing agents are more suitable in many respects and better adapted for the purpose of concentrating acetic acid than many of the other withdrawing agents previously used.

The function of a withdrawing agent is to form with the water in the acetic acid solution a mixture which will boil at a constant boiling point below the boiling point of either water or the withdrawing agent alone. Such a constant boiling mixture is commonly known in the art as an "azeotropic mixture" and will be hereafter referred to by that designation.

Most azeotropic mixtures having water as one of the components, such as the mixtures hereinafter more fully discussed, are found to follow in general the known principles of steam distillation. It is also found that if water be mixed with a liquid which is substantially immiscible therewith, the respective vapor pressures of the water and the other liquid are each substantially unaffected by the presence of the other, and the vapor pressure of the mixture is very nearly equal to the sum of the individual vapor pressures of the two liquids. Hence a vapor pressure curve of the mixture may be drawn by summing the separate vapor pressure curves of the two component liquids.

Also it is found that the molecular composition of vapors arising from such mixtures is substantially proportional to the respective vapor pressures of the constituents. The higher the vapor pressure of the other liquid mixed with water, the greater will be the number of molecules of such other liquid in any given quantity of vapor evolved from the mixture.

The efficiency of a concentration process involving an azeotropic mixture of water and a withdrawing agent depends to a material extent on the relative proportions of water and withdrawing agent which are vaporized. This depends in turn, upon the relative molecular percentages of the water and of the withdrawing agent, which molecular percentages, as above stated, are approximately proportional to the respective vapor pressures of the water and the withdrawing agent at the particular pressure under which boiling takes place, generally and preferably atmospheric pressure, although subatmospheric or superatmospheric pressures may be used if desired. Since the normal boiling points of liquids are temperatures at which their vapor pressures are the same, i. e. 76 centimeters of mercury, it follows that the vapor pressures of different liquids vary in general more or less inversely with their boiling points. Therefore a statement of the boiling point of a liquid gives a general rough indication of its relative vapor pressure characteristics, the liquids of higher boiling point having in general at all temperatures lower vapor pressures than liquids of lower boiling point.

Hence from the standpoint of efficiency as determined by the vapor pressure of the withdrawing agent, it is desirable to use withdrawing agents having relatively high boiling points and consequently lower vapor pressures. At the same time, the use of a withdrawing agent having a high boiling point is accompanied by the disadvantage that such an agent will not lower the boiling point of an azeotropic mixture with water to a sufficient extent to permit easy distillation of the azeotropic mixture from the acetic acid, the boiling point of which is approximately 118° C.

Also, it should be observed a withdrawing agent of high boiling point has the further disadvantage that its boiling point is so close to the boiling point of acetic acid that the withdrawing agent is apt to contaminate the concentrated acid during the distillation process. Thus in selecting withdrawing agents suitable for use, the advantages of higher or lower boiling points must be balanced with the corresponding disadvantages, and suitable agents must be selected which have to as large an extent as practicable, the advantages of high boiling point without an impractically large amount of the disadvantages thereof.

I have discovered that some suitable withdrawing agents for use in concentrating aqueous acetic acid solutions, are those such as heptane and/or dioxan which have boiling points at normal atmospheric pressure of more than 88° C. and less than 103° C. These withdrawing agents having boiling points between 88° C. and 103° C. have in general vapor pressures which, in azeotropic mixtures at or near normal atmospheric pressure, are not materially greater than the vapor pressure of the water in the azeotropic mixtures, so that a process employing such withdrawing agents has relatively high efficiency; yet the vapor pressures are sufficiently high so that the boiling point of the azeotropic mixture of the withdrawing agent and water is sufficiently lower than the boiling point of acetic acid to permit satisfactory distillation of the azeotropic mixture from the acetic acid solution and form pure acetic acid.

Viewed from a slightly different aspect, I find some suitable withdrawing agents are those whose vapor pressures, at the temperature of the boiling point of the azeotropic mixture with water, are not more than 60% nor less than 40% of the total vapor pressure of the azeotropic mixture. When the vapor pressure of the withdrawing agent is more than about 60% of the total vapor pressure of the azeotropic mixture, then the molecular percentage of the vapors from the azeotropic mixture is such that an uneconomically excessive quantity of withdrawing agent must be distilled over for each unit quantity of water removed from the mixture. Similarly, when the vapor pressure of the withdrawing agent is less than about 40% of the total vapor pressure of the mixture, the vapor pressure of the withdrawing agent is not sufficiently high to reduce the boiling point of the azeotropic mixture to a sufficient extent to permit easy and satisfactory distillation of the azeotropic mixture from the acetic acid solution and from pure acetic acid. Hence the vapor pressure limits of 60% and 40% above mentioned have been found to be suitable, and the present invention contemplates the use of the several withdrawing agents described having a vapor pressure between these limits.

Viewing the matter from still another aspect, I find that in general suitable withdrawing agents are those which form azeotropic mixtures with water in which the azeotropic mixture has a normal boiling point between 76° C. and 86° C. The three sets of limits above specified correspond in general with each other. That is, withdrawing agents whose vapor pressures are within the specified limits of 60% and 40% will be found to have boiling points approximately between the specified ranges of 88° C. and 103° C., and it will further be found that such agents form azeotropic mixtures with water which mixtures have boiling points approximately between the specified limits of 76° C. and 86° C.

Thus it is the physical or physical chemical properties rather than the strictly chemical properties of the withdrawing agents which are found to be important according to the present invention. Of course all liquids which have boiling points between 88° C. and 103° C. would not be suitable for the purposes of the present invention, because all of such liquids would not function as withdrawing agents. A withdrawing agent, as the term is understood in the art and as it is intended in this specification and in the accompanying claims, may be defined as a liquid which will form a constant boiling or azeotropic mixture with water. Generally a withdrawing agent is substantially immiscible with water, although some withdrawing agents which are miscible with water are known such as benzene. Those withdrawing agents which are substantially immiscible with water form azeotropic mixtures therewith in which the vapor pressure of the mixture at any temperature is substantially the sum of the separate vapor pressures of water and the withdrawing agent.

Thus, by definition, the term "withdrawing agent" as herein used automatically excludes all substances which will not form azeotropic mixtures with water. I do find, according to the present invention, that the withdrawing agents disclosed below having boiling points between 88° C. and 103° C. are suitable and satisfactory for use in the concentrating of acetic acid, whereas withdrawing agents boiling within this range of temperatures have heretofore been considered entirely unsuitable and impracticable.

As examples of suitable withdrawing agents boiling within this temperature range at normal atmospheric pressure, I have found the following materials to be more or less advantageous for the process described, the approximate boiling point under normal atmospheric pressure being indicated after the name of each substance:

|  | °C |
|---|---|
| Normal heptane | 98.5 |
| Diethylene dioxide (1,4-dioxan) | 101 |

Certain of these substances, such as normal heptane, form azeotropic mixtures at certain percentages with acetic acid as well as with water, and consequently have been found most useful only in concentrating acetic acid between certain ranges of strength or in concentrating acetic acid where an anhydrous acid mixed with some proportion of withdrawing agent may be discharged for use in some further operation.

The use of a withdrawing agent which forms an azeotropic mixture with acetic acid is not generally desirable, but may be suitable under special circumstances as above mentioned for example. Benzene, known in the prior art as a withdrawing agent (see Maude Patent No. 1,722,532, above mentioned), forms an azeotropic mixture with acetic acid boiling at about 80° C. containing about 98% benzene, but this does not prevent its use under some circumstances.

Similarly the use of a withdrawing agent within the range specified, such as normal heptane, which forms an azeotropic mixture with acetic acid, makes it more difficult or uneconomical to concentrate dilute aqueous acetic acid than by the preferred processes described in my other copending applications, but dependent on the column efficiency and generally if the amount of water in the starting solution is only comparatively small, the acid may be discharged from the still pot in a practically pure condition although the water may also contain some amounts of acid.

While normal heptane is similar to benzene, it is superior thereto for a number of reasons. For example, the benzene-acetic acid azeotrope, referred to above, boils at approximately 80° C. and the benzene-water azeotrope, which is the azeotrope desired separated by fractionation, boils at approximately 69° C. There is, therefore, only an increment of 11° C. to operate within, when employing benzene as the withdrawing agent. Consequently, for efficient separation of water, using benzene, a longer fractionation column would be required than when employing normal heptane.

That is, the normal heptane-acetic acid azeotrope boils at approximately 95° C. The heptane-water azeotrope boils at approximately 79° C. There is, therefore, the much larger temperature increment of 16° C. degrees when employing heptane according to the present application, consequently, as compared to benzene, greater ease in fractionating.

The other substance specifically mentioned above, diethylene dioxide (1,4-dioxan), does not, in its azeotropic mixtures with water, separate into two layers on standing. Consequently when such a substance is used as a withdrawing agent, it is more difficult to separate the agent from the water after the distillation. However, dioxan may be separated in accordance with a number of known methods of separating single phase azeotropic mixtures such as by salting out, adding a selective solvent, etc. described in detail, as for example, in the article by Sunier and Rosenblum published by Industrial and Engineering Chemistry, Jan. 15, 1930. Consequently a withdrawing agent of this kind may be used to advantage under some conditions, and its use is within the scope of this invention.

Figure 2:
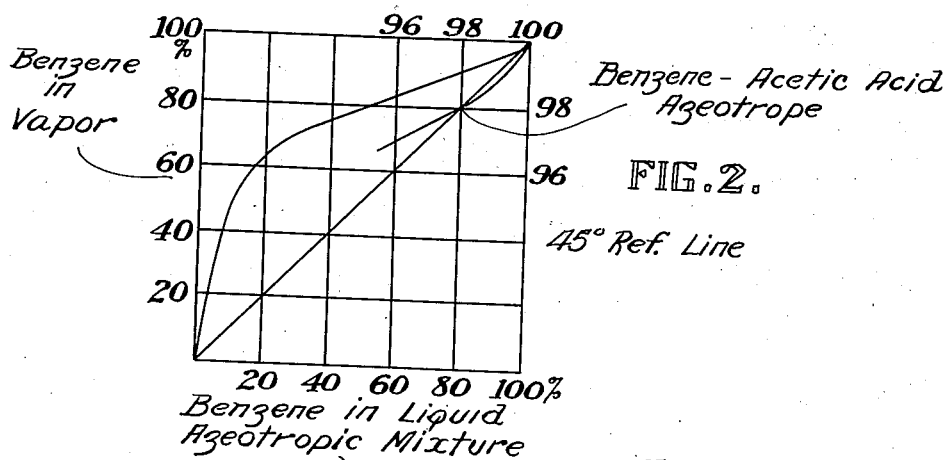
Fig. 2 is a vapor composition curve of a mixture of acetic acid and benzene.
Figure 3:
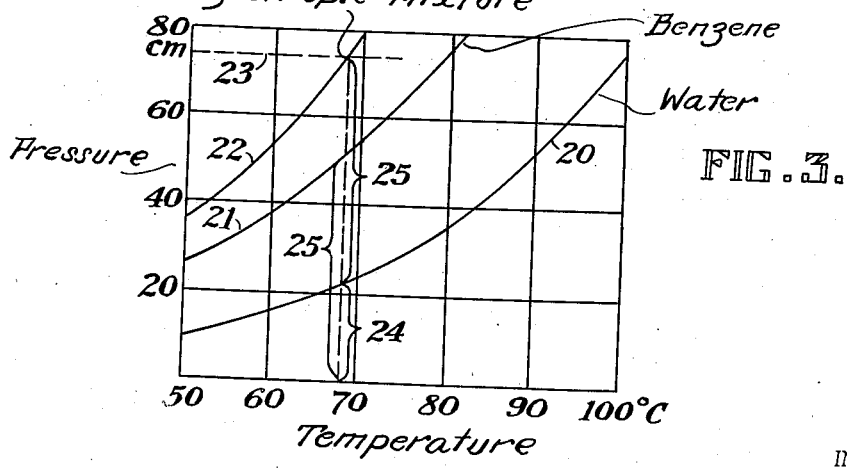
Fig. 3 is a vapor pressure curve illustrating water, benzene, and an azeotropic mixture of the two.

To aid in understanding the physical properties of the withdrawing agents and mixtures of the present invention, various curves are illustrated in Figs. 1 to 3 inclusive. Referring to these, Fig. 1 shows what is called a vapor composition curve of water and acetic acid. The abscissae of the graph are the percentages of water in the mixture, while the ordinates are the percentages of water vapor in the total vapor evolved by boiling. The 45° line is a reference line for the sake of comparison and indicates a percentage of water in the vapor equal to the percentage of water in the liquid mixture. It will be seen that the vapor composition curve of water and acetic acid diverges only to a comparatively slight extent from the 45° line so that only slightly more water vapor than acetic acid vapor is given off when a mixture of the two is boiled. This indicates that a simple mixture of water and acetic acid cannot be satisfactorily concentrated by distillation, and shows why it is necessary to use a withdrawing agent in order to concentrate aqueous acetic acid economically.

Fig. 2 illustrates a similar vapor composition curve of benzene and acetic acid in which the percentages indicated refer to benzene. The main curve is plotted on the main abscissae and the main ordinates indicated at the bottom and left hand side of the graph, respectively, while the supplementary curve is an enlargement of the upper right hand end of the main curve and is plotted on the enlarged scale abscissae and ordinates indicated at the top and right hand side of the graph, respectively, as is commonly understood by those familiar with curves of this kind. The enlarged supplementary curve clearly shows that the vapor composition curve crosses the 45° line when the benzene is approximately 98% of the total mixture, and such crossing of the 45° line indicates that at this point an azeotropic mixture of acetic acid and benzene is formed. A graph of the same general type would be obtained from normal heptane data if plotted, however, heptane is more efficient than benzene because of the various other properties of the 88° C.-103° C. boiling point class described above.

Fig. 3 shows a set of vapor pressure curves of water and benzene, one of the prior art withdrawing agents, and of a mixture of the two. The curve 20 is that of water, 21 that of benzene, and 22 that of the azeotropic mixture of the two. Line 23 indicates normal atmospheric pressure of 76 centimeters, and crosses the line 22 at about 68°, indicating this as the boiling point of the mixture. The bracket 24 indicates that of the total vapor pressure of 76 centimeters only a relatively small proportion or about 22 centimeters is due to the vapor pressure of the water, while a relatively large proportion or about 54 centimeters is due to the vapor pressure of the benzene as indicated by the brackets 25. Hence when using benzene, according to the prior art, it is necessary to distill many more molecules of the withdrawing agent for each given quantity of water molecules distilled than when using my new withdrawing agents according to the present invention. It will be seen that the vapor pressure and consequently the molecular percentage of the benzene is more than twice that of the water, and about 71% of the total vapor pressure of the mixture. When multiplying the molecular percentages by the molecular weights as above indicated, it is found that for every unit of water distilled from an azeotropic mixture of water and benzene, it is necessary to distill 10.6 units by weight of benzene, and since the latent heat of vaporization of benzene is 94, it requires almost exactly 1000 calories to distill the withdrawing agent necessary to carry over one gram of water from the mixture. This is much more wasteful of heat than when my new agents are used according to the present invention.

The boiling points, molecular percentages, and other figures given above by way of example are those obtained by calculation. In actual practice the results are found to be slightly different from but quite close to those calculated.

The various temperatures and vapor pressures above mentioned have been determined on the assumption that distillation will take place at normal atmospheric pressure of 76 centimeters of mercury, since this is ordinarily preferred. It is possible, however, to carry out the process of the present invention at pressures either above or below normal atmospheric.

Referring now to Fig. 4 of the drawings, there is shown a diagrammatic representation of a preferred embodiment of apparatus for carrying out the present invention with heptane, for example. The numeral 40 indicates a column still of any suitable and well known construction. The still may be of the type having a multiplicity of plates and the usual bubble caps. It is heated in any suitable manner, such as by the coil 41 to which steam or other heating fluid is supplied from the inlet 42 and discharged from the outlet 43.

To aid in controlling the process, the still is provided at intervals throughout its height with suitable temperature indicating devices such as the thermometers 44.

To start the process the still is initially charged with the aqueous acetic acid which is to be concentrated, and with the withdrawing agent selected for use, supplied through the conduit 45 from the container 46. Ordinarily, after the system is initially charged with withdrawing agent, the valve in the conduit 45 is closed and no further withdrawing agent is introduced from the container 46 except as small amounts may be required from time to time to make up for losses in the system by leakage. The withdrawing agent with which the still is originally charged flows through a continuous circuit and is returned to the still for use over and over again, as described hereinafter.

In the manner above described, the withdrawing agent will form an azeotropic mixture with the water in the aqueous acetic acid and the boiling point of this azeotropic mixture will be sufficiently lower than the boiling point of acetic acid so that the azeotropic mixture will be vaporized and will pass off from the top of the still through the conduit 50 and into the condenser 51 where it is condensed and whence it issues from the outlet 52 and flows to the gravity or other suitable separator 53. The acetic acid, meanwhile, gradually works downwardly in the column and may be removed from the bottom thereof in liquid phase if desired, although it is preferred to remove the concentrated acetic acid in vapor phase through the outlet 54 leading to the condenser 55, where it is condensed to liquid phase and discharged through the conduit 56 to any desired point.

The process is preferably carried on continuously once the still has been charged and started, additional aqueous acetic acid being supplied to the still through the inlet conduit 60 leading from any suitable source of supply such as the reservoir 61. The aqueous acetic acid supplied through the conduit 60 may be in either liquid or vapor phase, and the conduit may enter the column at an intermediate point in the height thereof, which point will be determined in the usual manner well understood by those skilled in the art.

The azeotropic mixture of water and heptane, after entering the separator 53, separates into two layers, a lighter layer at the top and a heavier layer at the bottom. A conduit 64 leads from the layer of withdrawing agent to the still so that the withdrawing agent after being separated is returned substantially continuously to the still to be used over and over again. In case the withdrawing agent employed is lighter than water, the top layer 65 in the separator 53 will be this agent while the bottom layer 66 will be water. Consequently the conduit 64 is connected to the separator 53 near the top thereof, and a water discharge conduit 67 leads from a point near the bottom of the separator. In case the withdrawing agent employed is one which is heavier than water, however, the relative positions of the layers in the separator will be reversed, of course, and the relative positions of the conduits 64 and 67 will be correspondingly reversed.

While the separator 53, in most instances, substantially separates the withdrawing agent from the water, there may be some amount of withdrawing agent dissolved or otherwise lost in the water. Frequently the amount of withdrawing agent contained in the water is not sufficient to justify recovery thereof, and the conduit 67 may then lead to waste, but if it is desired under any particular economic conditions to recover this withdrawing agent, then the conduit 67 may be led to any suitable recovery apparatus, which of course will depend on the agent to be recovered. For example, the auxiliary still 68 supplied with steam through the inlet 69 is suitable in any instances. In this still, the withdrawing agent is separated from the water and the vapors of the withdrawing agent pass off from the top of the still through the conduit 70 to a condenser 71 in which they are condensed and from which they are led through the conduit 72 to the separator 53. Thus the withdrawing agent contained in the water layer of the separator is recovered and returned to the main still 40 for further use. The water separated from the withdrawing agent in the auxiliary separating device 68 may be discharged therefrom through the discharge conduit 73.

In the case of dioxan, which as already pointed out does not separate into two layers on standing, the equipment shown in Fig. 4 would be modified to some extent. That is, the unit comprising separator 53, still 68, condenser 71 and associated parts would be replaced by a different separatory unit. The dioxan containing distillate rising in conduit 50 could be condensed in 51 and conducted through pipe 52 to any known separatory device wherein the dioxan may be recovered by salting out, adsorption, dissolving or any other suitable way and the recovered dioxan returned to the column through conduit 64 to be reused as already described.

Since substantially all of the withdrawing agent distilled off from the column still through the conduit 50 is returned to the column it follows that the rate of supply of the withdrawing agent to the column is ordinarily not variable, when the proper amount is in the system. The variable factors of the process are the rate at which heat is supplied through the conduit 42 and the rate at which acetic acid is supplied through the conduit 60. These two rates are varied as desired in order to obtain proper operation of the apparatus.

It is ordinarily desirable in operation to have at all points in the column the correct azeotropic ratio of withdrawing agent to the water in the acetic acid, even though it is only at the top of the column that the vapors are composed wholly of the azeotropic mixture to the exclusion of acetic acid vapor. At successively lower points in the column, where acetic acid is present in relatively greater and greater amounts and water is present in relatively smaller and smaller amounts, it is nevertheless desirable to maintain the theoretically correct azeotropic ratio between the water and the withdrawing agent. Such maintenance of correct ratios throughout the column constitutes the ideal case, and in practice it is ordinarily not possible to maintain this ratio correct at every point, but it may be maintained in a general or approximate way. For example, a branch of the conduit 64 may lead to some lower point of the column at which a small fraction of the returning withdrawing agent may be supplied.

Heretofore, prior processes of concentrating acetic acid have usually employed excesses of withdrawing agent, rather than just the right amount of withdrawing agent as contemplated by the present invention. Hence withdrawing agent has heretofore been present at most points of the column, the lower portion of the column having no water present but only a mixture of acetic acid and withdrawing agent. The present invention contemplates that the variable factors (rate of heating and rate of supply of aqueous acetic acid) should be so controlled that there will be no excess of withdrawing agent, and that at the point in the column at which the last of the water disappears, the last of the withdrawing agent will also disappear.

By watching the thermometers or other heat indicating devices 44 at the various points up and down the column, an operator skilled in the operation of a column still is enabled to ascertain very closely the composition of the mixture at various points in the column, and in this way he is enabled to control the process to accomplish the desirable result above set forth, varying the rate of heating and acetic acid supply as necessary, and adding additional withdrawing agent from time to time if this is found to be necessary.

When the process is carried on in the above desired manner according to the present invention, the still pot will contain substantially pure or glacial acetic acid, instead of acid having withdrawing agent mixed therewith as has usually been the case heretofore. Consequently there will be no problem of separating the withdrawing agent from the dehydrated acetic acid, and the latter will flow from conduit 56 in substantially pure form ready for any desired use.

When the withdrawing agent employed in the process is one of those falling within the scope of the invention, which are more efficient in general than the prior art withdrawing agent for the reasons previously mentioned, it is found that the volume of vapors distilled from the column to obtain a given amount of glacial acetic acid is substantially less than would be the case if less efficient withdrawing agents such as those of the prior art were employed. Hence the various parts of the apparatus can be made smaller than would otherwise be the case, since a less quantity of material need be handled, and this results in a substantial saving in cost as apparatus of this character is generally expensive because of its necessary chemical resisting qualities.

According to a modified process contemplated by the present invention, instead of adding a withdrawing agent to the dilute acetic acid, the withdrawing agent may be formed by chemical reaction in the dilute acetic acid itself, the substance added reacting either with the acetic acid or with the water which dilutes it. Hence the present invention is intended to include withdrawing agents formed or added in this manner, provided they fall within the temperature and other ranges specified, as well as those formed externally and added later to the dilute acetic acid.

The present invention also contemplates the use as a withdrawing agent of a mixture of the two or with additional substances which when mixed will boil or have other characteristics within the ranges heretofore specified, regardless of what the boiling points or other characteristics of the additional individual components before mixture may be.

According to another embodiment of the process, instead of passing the withdrawing agent directly from the separator 53 to the still column 40, some fraction of it may first be led to an extractor of any suitable known type for extracting one liquid by another, in which extractor the withdrawing agent will come into contact with aqueous acetic acid and extract the acetic acid from the water. The mixture of withdrawing agent, acetic acid, and any small amount of water which is unavoidably present, is then supplied to the column still and rectified in the manner previously described, to remove whatever water is present.

The bulk of the water which was originally mixed with the acetic acid is discharged from the extractor saturated with the withdrawing agent, and it may then be introduced through the conduit 67 into the auxiliary still 68 to have the withdrawing agent recovered in the manner previously described, the water free from withdrawing agent being discharged through the conduit 73.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

What I claim is:

1. In the process of dehydrating aqueous acetic acid, the step of supplying aqueous acetic acid vapor to the intermediate section of a distilling column, during distillation therein adding normal heptane at the upper part of the column, maintaining within the distilling system not more than the right amount of heptane to form an azeotropic mixture with the water in the acid vapors being distilled, and removing from the top of the column a constant boiling mixture of water and normal heptane.

2. The process of concentrating aqueous acetic acid which comprises mixing therewith not more than the right amount of at least one water withdrawing agent selected from the group consisting of heptane and dioxan to form an azeotropic mixture with the water in the aqueous acetic acid and distilling water and withdrawing agent from the mixture.

3. The process of dehydrating aqueous acetic acid to produce a dehydrated acid free of normal heptane which consists in mixing therewith a plurality of parts by weight of normal heptane for each part by weight of water contained in the aqueous acetic acid, the number of parts of normal heptane being not in excess of the azeotropic ratio with the parts of water contained in the mixture, distilling water and normal heptane from the mixture, and recovering dehydrated acetic acid in the vapor phase.

4. The continuous process of concentrating aqueous acetic acid to produce a concentrated acid free of normal heptane which comprises charging a still with a mixture of aqueous acetic acid and not more than the right amount of heptane to form an azeotropic mixture with the water in the aqueous acetic acid, distilling water and heptane from the mixture, condensing the distillate and substantially separating the heptane from the water therein, returning the separated heptane substantially continuously to the still and supplying further aqueous acetic acid substantially continuously to the still, the heptane being returned to the still at a rate to supply heptane in a quantity not in excess of the right amount to form an azeotropic mixture with the water contained in the aqueous acetic acid being supplied to the still.

5. The process of concentrating aqueous acetic acid which comprises mixing therewith approximately right amount of dioxan to form an azeotropic mixture with the water in the aqueous acetic acid and distilling water and dioxan from the mixture.

6. The continuous process of concentrating aqueous acetic acid to produce a concentrated acid free of dioxan which comprises charging a still with aqueous acetic acid vapors and just the right amount of dioxan to form an azeotropic mixture with the water in the aqueous acetic acid vapor, distilling water and dioxan from the mixture, condensing the distillate and substantially separating the dioxan from the water therein, returning the separated dioxan substantially continuously to the still and supplying further aqueous acetic acid substantially continuously to the still, the dioxan being returned to the still at a rate just right to form an azeotropic mixture with the water contained in the aqueous acetic acid being supplied to the still.

7. The continuous process of concentrating aqueous acetic acid to produce a concentrated acid free of withdrawing agent which comprises charging a still with a mixture of aqueous acetic acid and not more than the right amount of at least one water withdrawing agent, selected from the group consisting of normal heptane and 1,4-dioxan, to form an azeotropic mixture with the water in the aqueous acetic acid, distilling water and withdrawing agent from the mixture, condensing the distillate and substantially separating the withdrawing agent from the water therein, returning the separated withdrawing agent substantially continuously to the still, supplying further aqueous acetic acid substantially continuously to the still, the withdrawing agent being returned to the still at a rate to supply a quantity of withdrawing agent not more than sufficient to form an azeotropic mixture with the water contained in the aqueous acetic acid being supplied to the still, and further distilling water and withdrawing agent from the mixture, thereby leaving a residue containing concentrated acetic free of withdrawing agent, heating said residue sufficiently to cause at least some of the concentrated acid to exist in the vapor phase, conducting away these actic acid vapors free of withdrawing agent and condensing these vapors to the liquid phase.

8. The continuous process of removing water from aqueous acetic acid by distillation in a distillation column operating under substantially balanced conditions, which comprises charging a column with the acetic acid solution to be dehydrated and a withdrawing agent comprising normal heptane, distilling water and withdrawing agent from the mixture, condensing the distillate, at least partially separating the withdrawing agent from the watery content of the distillate, returning separated agent to the column, passing separated watery content containing the withdrawing agent to an auxiliary unit for the recovery of the contained withdrawing agent, and returning the recovered withdrawing agent to the column for assisting in preventing the column from coming to an unbalanced condition.

DONALD F. OTHMER.